July 5, 1960  R. B. PETTIBONE  2,943,575
POWER TRANSMISSION
Filed Jan. 28, 1954

INVENTOR.
RAYMOND B. PETTIBONE
BY
Ralph L. Tweedale
ATTORNEY

United States Patent Office 2,943,575
Patented July 5, 1960

2,943,575

POWER TRANSMISSION

Raymond B. Pettibone, Detroit, Mich., assignor to Vickers Incorporated, Detroit, Mich., a corporation of Michigan Filed Jan. 28, 1954, Ser. No. 406,634

8 Claims. (Cl. 103—42)

This invention relates to power transmissions, and is particularly applicable to those of the type comprising two or more fluid pressure energy translating devices, one of which may function as a pump and another as a fluid motor.

This invention relates to pumps and more particularly to the type of unit known as a "power pack" comprising a pump, fluid reservoir, and usually a valve or valves integrated into a compact unit. These power pack units have had wide acceptance in the automotive and agricultural fields due to their compactness and the ease of installation. Simplicity, ruggedness of construction, low cost, long life, and efficient operation are of paramount importance in the design of such a unit. With the increasing emphasis being put on passenger car applications of hydraulic power, for example: hydraulic steering boosters and hydraulic window lifts, quietness of operation has become an additionally important criterion of such units. One of the most frequent causes of pump noise results from inability of atmospheric pressure to completely fill the pump inlet zones with fluid. This phenomenon is termed cavitation, and occurs primarily during high-speed operation. To avoid cavitation the prior art has utilized various schemes to increase the pump inlet pressure or, as it is commonly expressed, to "supercharge" the pump inlet.

One widely used scheme for supercharging the inlet of a pump utilizes the velocity effect of fluid by-passed by a spillover type flow control valve. Since fluid requirements of motor vehicle accessories such as hydraulic steering boosters may be as high when the engine is idling as they are when it is at high speed, a fluid pump to supply those accessories must have a substantial delivery rate while the engine idles. Further, since the speed of a motor vehicle engine varies in the ratio of approximately 1 to 10 from idle to full speed, the speed of a pump coupled directly to the engine will vary in the same ratio. The result is excessively fluid delivery rates with consequent power loss during highway operation of the vehicle. A spillover type flow control valve responsive to the pump delivery rate has been found an effective solution to this problem.

It has been previously proposed to pass the fluid spilled over by such flow control through a relatively constricted passage, or venturi like throat, to produce a high-speed jet, and to utilize the velocity effect of that jet to increase the pressure in the inlet zones of the pump. One of the disadvantages of such prior units has been the fact that once the spill-over flow control valve opens, the amount of supercharge obtained is dependent almost completely on the volume of fluid being by-passed. This variance in supercharge pressure is undesirable. Too little supercharge results in cavitation and noise, whereas too much supercharge causes excessive leakage at the pump shaft seal and excessive circulation in the reservoir bleed loop, with consequent turbulence and aeration of the fluid in the reservoir. If the venturi throat is so proportioned as to avoid oversupercharging, insufficient supercharge may result at the lower speeds.

It is an object of this invention to provide a fluid circulating system for use in supercharging a pump inlet which avoids the above mentioned disadvantages of prior devices.

More particularly, it is an object of this invention to provide improved means for increasing the inlet pressure of pumping mechanism which utilizes fluid by-passed by a spillover type flow control valve and which is of simple low-cost construction.

A further important object is to provide a system of the type described which will, as contrasted to prior devices, maintain relatively constant supercharge pressure over a wide range of pump speeds.

It is also an object of this invention to provide a fluid circulating system of the type described in which aeration and turbulence of the circulating fluid is minimized.

Further objects and advantages of the present invention will be apparent from the following description, reference being had to the accompanying drawing wherein a preferred form of the present invention is clearly shown.

Figures 1, 2:
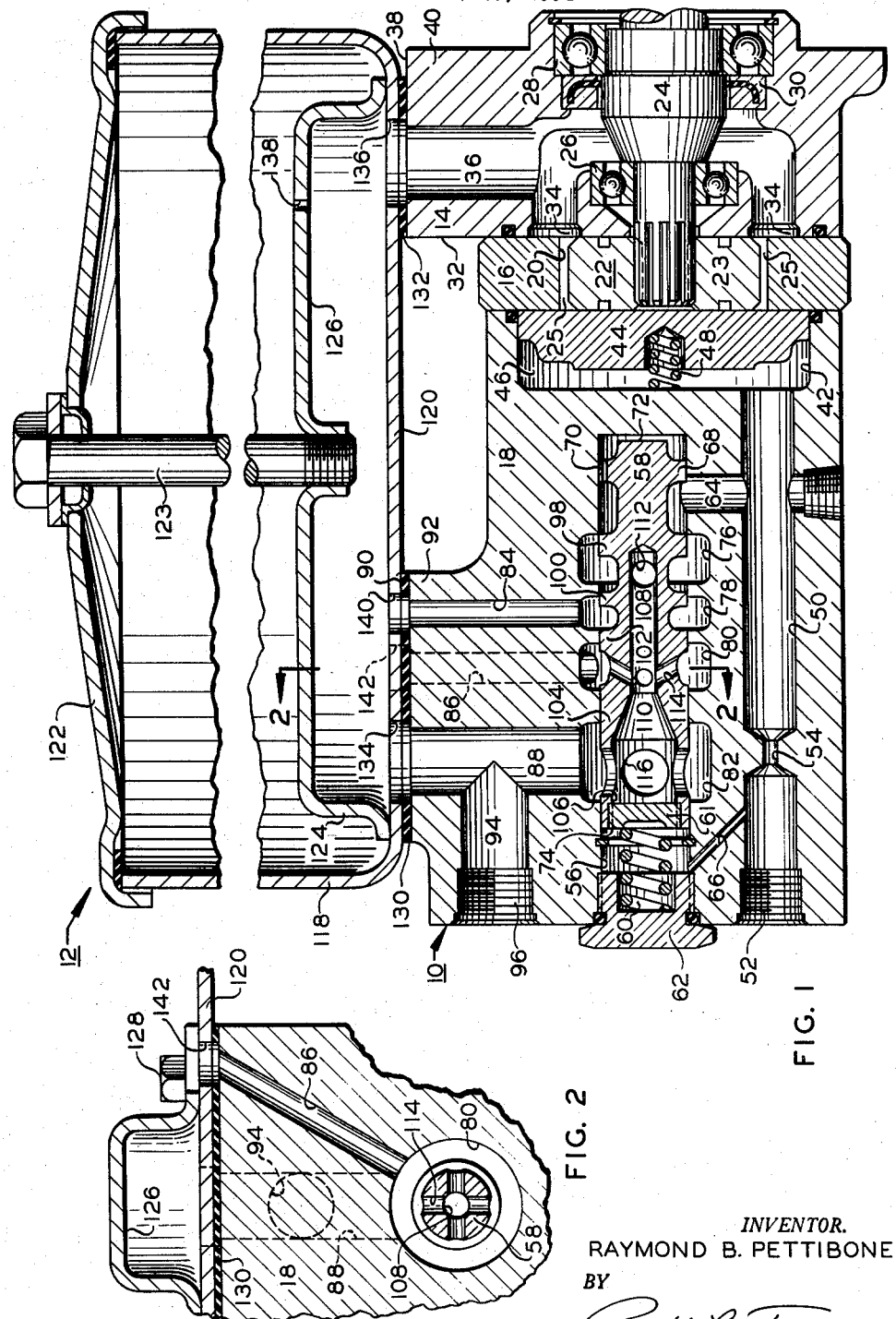
Figure 1 is a longitudinal sectional view of a device embodying the present invention.
Figure 2 is a partial section taken on line 2—2 of Figure 1.

Referring now to Figure 1 there is shown a pump generally designated 10 and a reservoir generally designated 12. The pump 10 includes a body portion 14, a ring 16, and a head 18 arranged in a sandwich relation and secured together by a plurality of bolts not shown which extend through the head and ring into threaded holes in the body.

The ring 16 provides a stator element having a pumping chamber 20 thereof. Rotary pumping mechanism generally designated 22 includes a rotor 23 and vanes 25 and is supported in the pumping chamber 20 by a driven shaft 24. Shaft 24 is rotatably carried by bearings 26 and 28 in the body 14. A conventional shaft seal 30 prevents leakage of fluid from the body 14 at the point of emergency therefrom of the shaft 24. The body 14 includes a flat plane face 32 against which the ring 16 and the pumping mechanism 22 abut and has therein a pair of inlet ports 34 which communicate with the pumping chamber 20. The inlet ports 34 communicate with a branched passage 36 which extends to the face 38 of a flange 40 on body 14.

The head member 18 has a bore 42 therein in which is positioned a pressure plate 44. The pressure plate 44 coacts with the bore 42 to form a pressure chamber 46. High pressure delivery ports, not shown, extend completely through the pressure plate 44 from pressure chamber 46 to the pumping chamber 20. A spring 48 biases the pressure plate 44 into axial abutment with the ring 16 and the rotary pumping mechanism 22 in the pumping chamber 20. The pumping mechanism per se forms no part of the present invention and consequently has been described very briefly.

A delivery passage 50 extends from the pressure chamber 46 to a threaded external connection port 52. The delivery passage 50 has therein a restriction or metering orifice 54. Valve bore 56 extends from the end of the head 18 and has a flow controlling valve spool 58 slidably positioned therein. The spool 58 is biased to its normal position by a spring 60. The spring 60 is exerted on the spool 58 through a plug 61 which effects a fluid tight closure of the central bore in the spool. Spring 60 is retained by a plug 62 which closes the outer end of bore 56.

The valve bore 56 includes a plurality of axially spaced annular enlargements, communication between which is controlled by lands on the spool 58. The bore 56 is directly intersected by a pair of passages 64 and 66. Passage 64 extends from the delivery passage 50 upstream of the restriction 54 to intersect valve bore 56 near its inner end. Passage 66 extends from the delivery passage 50 downstream of the restriction 54 to intersect valve bore 56 near its outer end. The valve spool 58 includes a land 68 which is interposed between the passage 64 and the inner end of the valve bore 56. Fluid communication between the passage 64 and the inner end of valve bore 56 is established by a restricted passage 70 which extends through the land 68. Pressure from the upstream side of restriction 54 is thus conducted through passage 64 and restricted passage 70 to be exerted on the area 72 at the inner end of valve spool 58. The resistance to fluid flow offered by passage 70 damps the movement of spool 58 and affords smooth operation. Pressure downstream of the orifice 54 is conducted to the valve bore 56 through the passage 66 and is imposed on the area 74 on the spool, which area is equal and opposed to area 72. The axial position of valve spool 58 in bore 56 will thus be dictated by the load of spring 60 and the pressure drop across the restriction 54.

The annular channels in the valve bore 56 are four in number and are designated 76, 78, 80, and 82. Channels 78, 80, and 82 communicate respectively with transverse passages 84, 86, and 88 which extend to the face 90 of a flange 92 on the head 18. Passage 88 is intersected by an axial passage 94 having a threaded external connection port 96 therein.

The spool 58 includes a pair of valving lands 98 and 100. Land 98 controls communication between the passage 64 and the annular channel 76 while the land 100 governs communication between channel 76 and channel 78. A land 102 isolates the channel 78 from the channel 80 throughout the full movement of the spool 58. Similarly channel 80 is continuously isolated from channel 82 by that portion of the valve spool designated 104.

A central bore 106 in the valve spool 58 includes a portion 108 of relatively small cross sectional area and a flared portion 110. A transverse drilled passage 112 extends into the spool 58 between lands 98 and 100 to intersect passage 106 in the constricted portion 108. The constricted portion 108 of passage 106 is also intersected by a plurality of substantially radial drilled passages 114. The passage 112 is in continuous communication with the channel 76 in all positions of the valve spool 58 and the passages 114 are in continuous communication with the channel 80. Transverse holes 116 in spool 58 effect continuous and relatively unrestricted communication between the bore 106 and the channel 82.

The reservoir 12 includes generally cylindrical side walls 118 and a flat bottom 120. The open end of the tank is closed by a cover 122 secured in place by a cover screw 123. The tank includes a false bottom 124 having an inverted U-shaped channel 126 stamped therein. The false bottom 124 is secured in place by the same bolts 128 which extend through the tank bottom to secure the reservoir to the flanges 40 and 92 of the body 14 and head 18, respectively. Gaskets 130 and 132 prevent leakage at the juncture between the reservoir and the flanges 92 and 40. The tank bottom 120 has an opening 134 therein which coincides with, and overlies, the passage 88 in the pump head. A similar opening 136 overlies the passage 36 in the body 14. The U-shaped channel 126 connects the passage 88 in the head 18 and the passage 36 in the body 14 in relatively closed communication. A bleed hole 138 extends through the channel 126 to communicate with the interior of the reservoir for a purpose to be later described.

As heretofore noted the transverse passage 84 which communicates with the annular channel 78 extends to the face 90 of flange 92. A third opening 140 in the bottom 120 of the reservoir 12 overlies the passage 84 and establishes communication between passage 84 and the interior of channel 126. A fourth opening 142 in the bottom of reservoir 12 overlies the end of passage 86, and establishes communication between the interior of the reservoir 12 and the annular channel 80 in the valve bore 56.

The fluid by-passed through bore 106, when land 98 establishes communication between passage 64 and annular channel 76, is utilized to supercharge the pump inlet zones. In the relatively small area of constriction 108, the by-passed fluid will attain a high velocity. In accordance with familiar physical laws, the high velocity of the jet in constriction 108 will be accompanied by a relatively low static pressure. Fluid from the reservoir will thus be induced to move through passage 86, annular channel 80, and the radial passages 114 and will be entrained in the by-passed fluid. Fluid taken from the reservoir in this manner serves to replenish leakage and other losses in the system. In the relative quiescence of the larger areas of the remainder of the by-pass passages, the velocity energy of the jet is converted to static pressure which supercharges the inlet zones of the pumping mechanism.

In a normal installation, ports 52 and 96 would be connected respectively to the inlet and outlet of a fluid motor. High pressure fluid from the pump thus passes through the delivery passage 50, and low pressure fluid returning from the motor to the pump inlet passes through a return passage comprising passage 94, the upper portion of passage 88, channel 126, and the branched passage 36.

In operation, when delivery from the pump mechanism 22 exceeds a predetermined rate, as established by the load of spring 60, the pressure drop across orifice 54 acting on the opposed areas 72 and 74 of spool 58 will shift the spool to the left. As spool 58 shifts, the land 98 will establish communication between the passage 64 and the channel 76. Fluid will thus be diverted from the delivery passage 50 into the channel 76 and by-passed back to the inlet zones of the pump through a by-pass passage comprising: radial hole 112, the central passage 106 in spool 58, passage 88, channel 126 and branched passage 36.

In the position illustrated, spool 58 has moved to a point in its path of travel wherein land 98 is just about to establish communication between passage 64 and channel 76. It can be seen that at this time the land 100 has not yet established communication between the channels 76 and 78, and that further movement of the spool is required to do so. This arrangement insures that as the valve spool 58 moves to the left, communication will first be established between passage 64 and the channel 76 and that a predetermined amount of additional movement must take place before the land 100 establishes communication between channels 76 and 78.

Should the pump speed increase beyond the point at which land 98 first establishes communication between passage 64 and channel 76 the valve spool 58 will continue to shift to the left diverting an increasingly larger portion of the pump output into the by-pass passage. At all speeds above its cracking point, the valve 58 will tend to maintain the pressure drop through the orifice 54 constant, and thus maintain the flow rate therethrough constant. It can be seen that there will be a wide variance in the flow rate of the diverted fluid. As the valve 58 continues to move to the left diverting more fluid into the by-passed passage, the flow rate through the constricted portion 108 of the central passage 106 will increase with consequent increase in the supercharge pressure created. The dimensional relations between the lands on the spool 58 and the annular channels in the bore 56 are so selected that when flow in the by-pass passage reaches that rate which produces the maximum desired supercharge, the land 100 will establish communication between channel 76 and channel 78. Thus, as the valve 58 continues to move to the left, an increasingly large amount of the by-passed fluid will be diverted from the annular channel 76 to the annular channel 78 and will pass to the channel 126 directly through the passage 84. Since the fluid diverted directly to the channel 126 through passage 84 has no supercharging effect, the maximum supercharge pressure will be limited to substantially that amount produced just prior to the establishment of communication between channels 76 and 78.

As was heretofore noted, the small drilled passage 138 extends through the channel 126 to establish restricted communication between the interior of channel 126 and the fluid in the reservoir 12. During non-supercharged operation the passage 138 acts, in conjunction with passage 86, channel 80, and the drilled passages 114 in spool 58, to conduct fluid from the reservoir to the return passage to replenish leakage and other losses in the system. When the valve 58 opens to divert fluid into the by-passed passage pressure in the channel 126 is increased. Flow through the passage 138 will reverse and fluid will circulate from the interior of channel 126 to the reservoir 12. The fluid thus diverted through the passage 138 is cleaned, cooled, and deaerated in the reservoir 12 and fresh, replacement fluid enters the system through the passage 86.

By limiting the maximum supercharge pressure produced, the present invention prevents excessive circulation through the reservoir bleed loop and avoids the accompanying problems of aeration and turbulence in the reservoir. Further, longer shaft seal life and lower leakage are direct results of practice of this invention.

These objects have been accomplished with a structure that has low original cost and provides long and trouble free service life.

While the form of embodiment of the invention as herein disclosed constitutes a preferred form, it is to be understood that other forms might be adopted, all coming within the scope of the claims which follow.

What is claimed is as follows:

1. A fluid distributing system for use with fluid pumping mechanism having inlet and outlet zones, comprising: means forming a delivery passage extending from said outlet zone; means forming a return passage extending to said inlet zone; means forming a by-pass passage extending from said outlet zone to said inlet zone; first valve means responsive to flow in said delivery passage controlling flow in said by-pass passage; a source of replenishing fluid; means in said by-pass passage for utilizing the velocity effect of flow therein to entrain said replenishing fluid and supercharge said inlet zone; means forming an auxiliary passage leading to said inlet zone and having a juncture with said by-pass passage upstream from said means in said by-pass passage; and second valve means for controlling flow in said auxiliary passage to divert flow from said by-pass passage, whereby the amount of supercharge can be limited.

2. A fluid distributing system for use with fluid pumping mechanism having inlet and outlet zones, comprising: means forming a delivery passage extending from said outlet zone; means forming a return passage extending to said inlet zone; means forming a by-pass passage extending from said outlet zone to said inlet zone, said by-pass passage means including a portion of said return passage; first valve means responsive to flow in said delivery passage controlling flow in said by-pass passage; a source of replenishing fluid; means in said by-pass passage for utilizing the velocity effect of flow therein to entrain said replenishing fluid and supercharge said inlet zone; means forming an auxiliary passage leading to said inlet zone and having a juncture with said by-pass passage upstream from said means in said by-pass passage; and second valve means for controlling flow in said auxiliary passage to divert flow from said by-pass passage, whereby the amount of supercharge can be limited.

3. A fluid distributing system for use with fluid pumping mechanism having inlet and outlet zones, comprising: means forming a delivery passage extending from said outlet zone; means forming a return passage extending to said inlet zone; means forming a by-pass passage extending from said outlet zone to said inlet zone; first valve means responsive to flow in said delivery passage controlling flow in said by-pass passage; a source of replenishing fluid; means in said by-pass passage for utilizing the velocity effect of flow therein to entrain said replenishing fluid and supercharge said inlet zone; means forming an auxiliary passage leading to said inlet zone and having a juncture with said by-pass passage upstream from said means in said by-pass passage, said auxiliary passage means including a portion of said return passage; and second valve means for controlling flow in said auxiliary passage to divert flow from said by-pass passage whereby the amount of supercharge can be limited.

4. A fluid distributing system for use with fluid pumping mechanism having inlet and outlet zones, comprising: means forming a delivery passage extending from said outlet zone; means forming a return passage extending to said inlet zone; means forming a by-pass passage extending from said outlet zone to said inlet zone, said by-pass passage means including a portion of said return passage; a source of replenishing fluid; first valve means responsive to flow in said delivery passage controlling flow in said by-pass passage; means in said by-pass passage for utilizing the velocity effect of flow therein to entrain said replenishing fluid and superchange said inlet zone; means forming an auxiliary passage leading to said inlet zone and having a juncture with said by-pass passage upstream from said means in said by-pass passage, said auxiliary passage means including a portion of said return passage; and second valve means for controlling flow in said auxiliary passage to divert flow from said by-pass passage, whereby the amount of supercharge can be limited.

5. A fluid distributing system for use with fluid pumping mechanism having inlet and outlet zones, comprising: means forming a delivery passage extending from said outlet zone; means forming a return passage extending to said inlet zone; means forming a by-pass passage extending from said outlet zone to said inlet zone; first valve means responsive to flow in said delivery passage controlling flow in said by-pass passage; a source of replenishing fluid; means in said by-pass passage for utilizing the velocity effect of flow therein to entrain said replenishing fluid and supercharge said inlet zone; means forming an auxiliary passage leading to said inlet zone and having a juncture with said by-pass passage upstream from said means in said by-pass passage; and second valve means for controlling flow in said auxiliary passage to divert flow from said by-pass passage, said second valve means being shiftable conjointly with said first valve means whereby the amount of supercharge can be limited.

6. A fluid distributing system for use with fluid pumping mechanism having inlet and outlet zones, comprising: means forming a delivery passage extending from said outlet zone; means forming a return passage extending to said inlet zone; means forming a by-pass passage extending to said inlet zone; a source of replenishing fluid; means in said bypass passage for utilizing the velocity effect of fluid flow therein to entrain said replenishing fluid and supercharge said inlet zones; means forming an auxiliary passage extending to said inlet zone; means forming a valve bore having spaced ports communicating with said outlet zone, said by-pass passage, and said auxiliary passage; and valve means in said valve bore responsive to flow in said delivery passage to shift to a first position wherein said outlet zone and said by-pass passage are interconnected, and a second position wherein said outlet zone and both said by-pass passage and said auxiliary passage are interconnected, whereby the amount of supercharge can be limited.

7. In a fluid distributing system for use with fluid pumping mechanism: inlet and outlet zones for said pumping mechanism; a fluid reservoir; means forming a delivery passage extending from said outlet zone; means forming a return passage extending to said inlet zone; means forming a second passage extending to said inlet zone; means forming a supply passage extending from said reservoir; means forming a valve bore having spaced ports communicating with said outlet zone, said second passage, and said supply passage; a valve member in said bore shiftable in response to flow in said delivery passage; conduit means internal of said valve member to interconnect said delivery passage and said second passage on shifting of said valve member; and means in said conduit means for utilizing the velocity effect of fluid flow therein to entrain fluid from said reservoir and supercharge said inlet zone.

8. In a fluid distributing system for use with fluid pumping mechanism: inlet and outlet zones for said pumping mechanism; a fluid reservoir; means forming a delivery passage extending from said outlet zone; means forming a return passage extending to said inlet zone; means forming a second passage extending to said inlet zone; means forming a third passage extending to said inlet zone; means forming a supply passage extending from said reservoir; means forming a valve bore having spaced ports communicating with said outlet zone, said second passage, said third passage, and said supply passage; a valve member in said bore shiftable in response to flow in said delivery passage; conduit means internal of said valve member to interconnect said delivery passage and said second passage on shifting of said valve member; means in said conduit means for utilizing the velocity effect of fluid flow therein to entrain fluid from said reservoir and supercharge said inlet zone; and means associated with said valve member to interconnect said outlet zone and said third passage, whereby the amount of supercharge can be limited.

References Cited in the file of this patent

UNITED STATES PATENTS

| | | |
|---|---|---|
| 2,380,606 | Moody | July 31, 1945 |
| 2,385,513 | Helvern | Sept. 25, 1945 |
| 2,642,148 | Grise | June 16, 1953 |
| 2,683,418 | Smith | July 13, 1954 |
| 2,733,662 | Hunter | Feb. 7, 1956 |
| 2,748,711 | Drude | June 5, 1956 |
| 2,800,083 | Tweedale et al. | July 23, 1957 |